J. H. GENTER.
AUTOMATIC ANNUNCIATOR.
APPLICATION FILED MAY 14, 1913.
1,097,310.
Patented May 19, 1914.
3 SHEETS—SHEET 1.
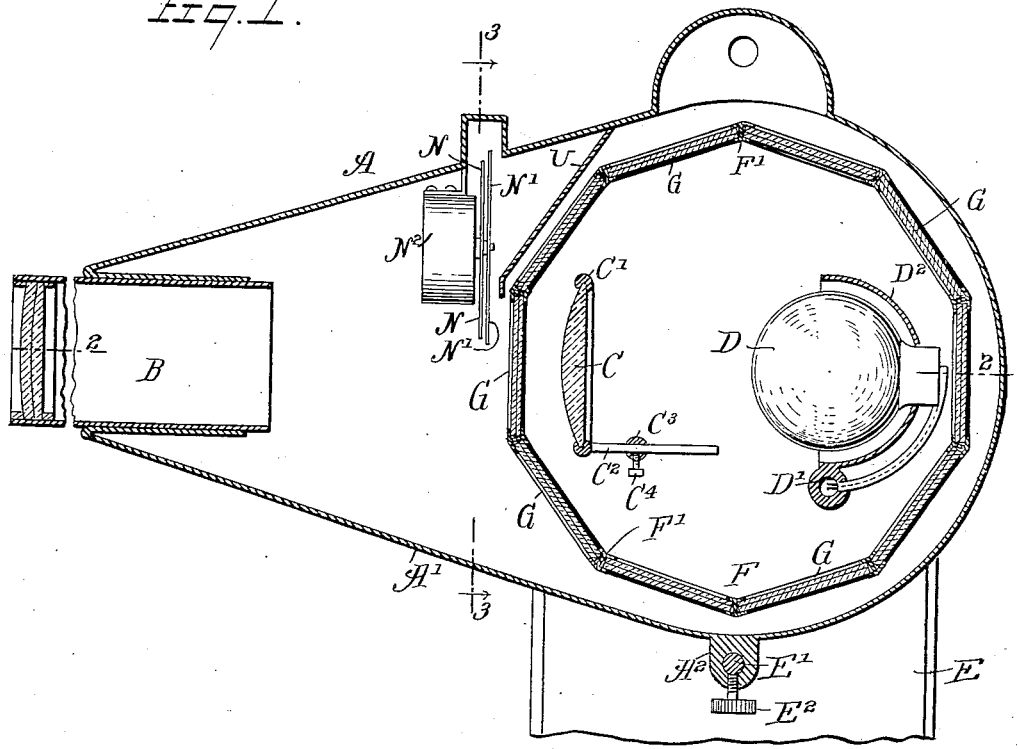
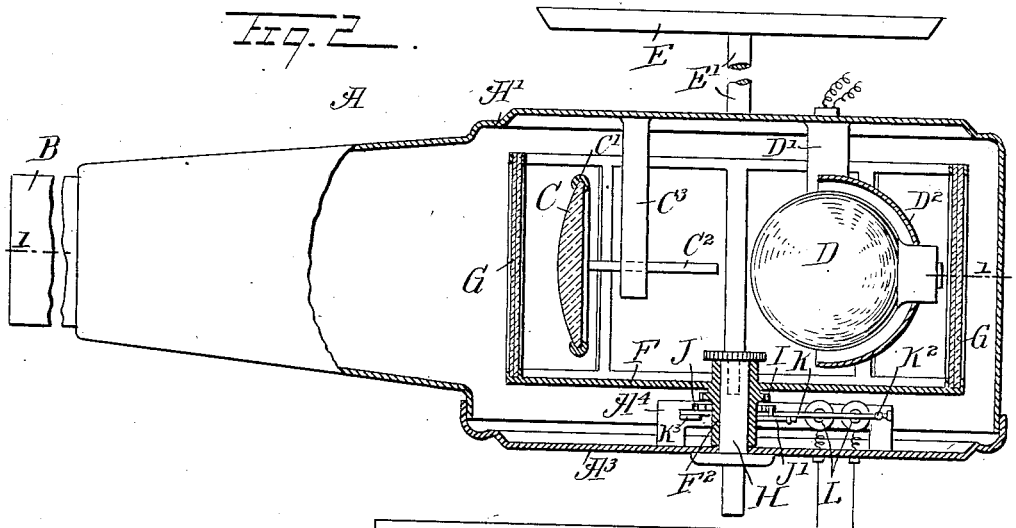
WITNESSES
INVENTOR
Jacob H. Genter
BY
ATTORNEYS

J. H. GENTER.
AUTOMATIC ANNUNCIATOR.
APPLICATION FILED MAY 14, 1913.

1,097,310.

Patented May 19, 1914.
3 SHEETS—SHEET 2.

WITNESSES
H. J. Walker
Rudy. Hoskins

INVENTOR
Jacob H. Genter
BY Munn & Co
ATTORNEYS

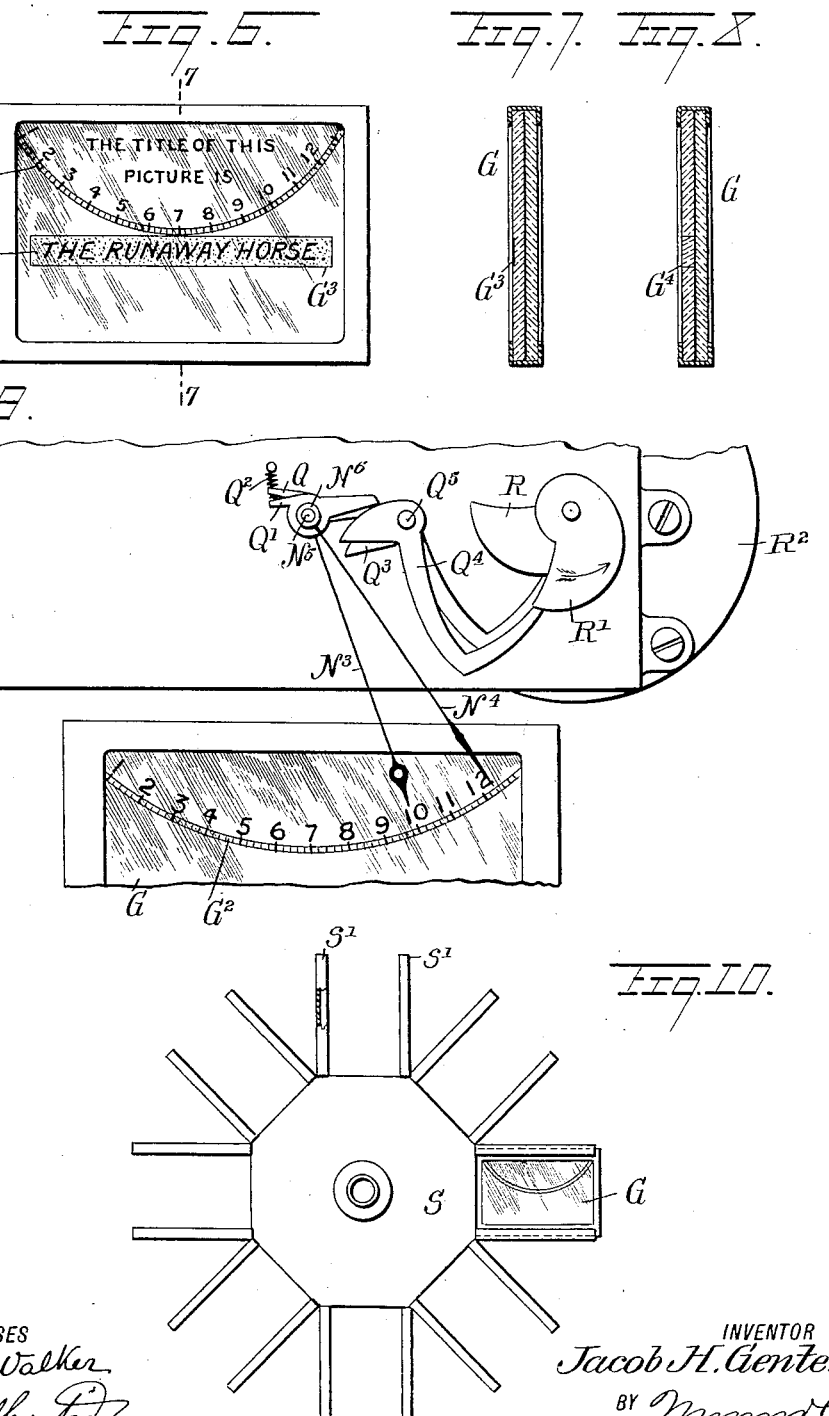

UNITED STATES PATENT OFFICE.

JACOB H. GENTER, OF NEWBURGH, NEW YORK.

AUTOMATIC ANNUNCIATOR.

1,097,310.  Specification of Letters Patent.  Patented May 19, 1914.

Application filed May 14, 1913. Serial No. 767,562.

*To all whom it may concern:*

Be it known that I, JACOB H. GENTER, a citizen of the United States, and a resident of Newburgh, in the county of Orange and State of New York, have invented a new and Improved Automatic Annunciator, of which the following is a full, clear, and exact description.

The invention relates to projecting apparatus for projecting pictures or other subject matter on a screen, wall, sidewalk or other surface.

The object of the invention is to provide a new and improved automatic annunciator arranged to announce the time and legends representing advertisements or titles to vaudeville acts, or titles for moving pictures and the like.

In order to accomplish the desired result, use is made of a projecting apparatus and time-indicating means mounted in said apparatus onto a distant surface. Use is also made of a slide carrier mounted to rotate intermittently within the projecting apparatus, the slide carrier supporting a series of slides adapted to move successively into the field of the projecting apparatus to be projected onto a distant surface, each of the slides being provided with a legend and with a segmental time dial operating in conjunction with clock-driven hour and minute hands extending into the field of the projecting apparatus, so that the time of the day or night is displayed on the screen together with the subject matter of the slide.

A practical embodiment of the invention is represented in the accompanying drawings forming a part of this specification, in which similar characters of reference indicate corresponding parts in all the views.

Figure 3:
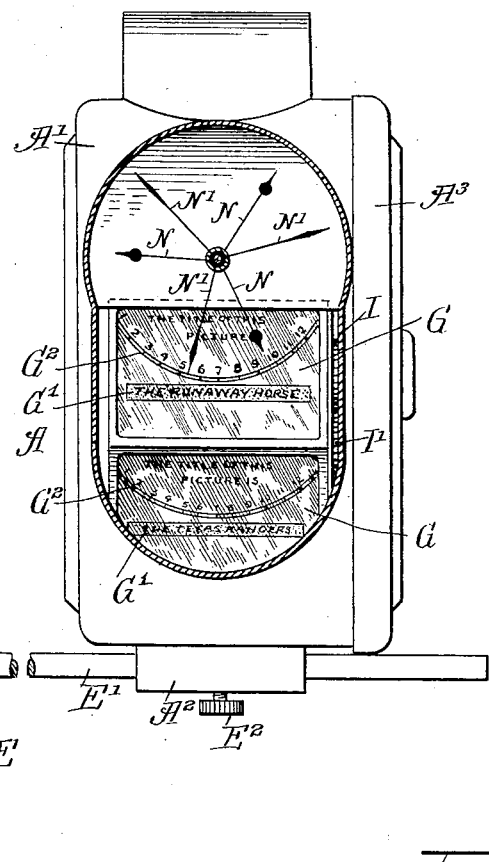
Figure 4:
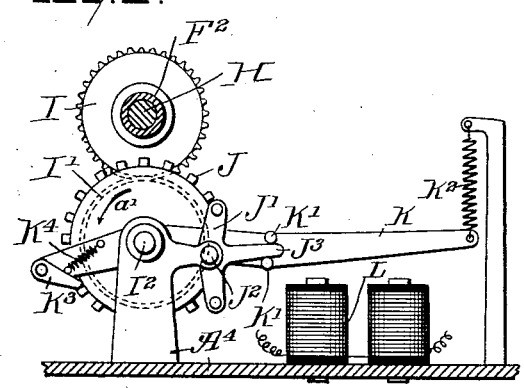
Figure 5:
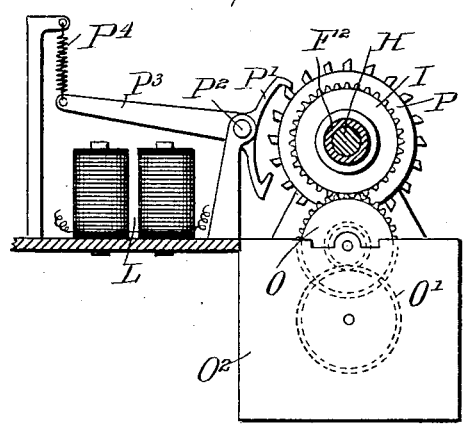

Figure 1 is a sectional side elevation of the annunciator, the section being on the line 1—1 of Fig. 2; Fig. 2 is a sectional plan view of the same on the line 2—2 of Fig. 1; Fig. 3 is a cross section of the same on the line 3—3 of Fig. 1; Fig. 4 is an enlarged sectional side elevation of the mechanism for imparting an intermittent rotary motion to the slide carrier; Fig. 5 is a similar view of a modified form of the same; Fig. 6 is an enlarged face view of one of the slides; Fig. 7 is a cross section of the same on the line 7—7 of Fig. 6; Fig. 8 is a similar view of a modified form of slide; Fig. 9 is an enlarged face view of a modified form of the time-indicating mechanism; and Fig. 10 is a face view, partly in section, of a modified form of slide carrier.

In carrying out the invention use is made of a projecting apparatus A having a casing A′ in which is mounted an objective B, a condenser lens C and a source of light D in the rear of the condenser lens, as indicated in Figs. 1 and 2. The casing A′ is removably held on a bracket E attached to a wall, post or other suitable support and having a rod E′ passing through an apertured boss $A^2$ held in the bottom of the casing A′. The boss $A^2$ is provided with a set screw $E^2$ adapted to engage the rod E′ so as to securely fasten the casing A′ on the rod E′ of the bracket E.

Within the casing A′ of the projecting apparatus A is mounted to rotate intermittently a slide carrier F, preferably in the form of a skeleton wheel provided at its peripheral face with guideways F′ for the reception of removable slides G containing the subject matter to be projected by the projecting apparatus onto a distant screen, wall, sidewalk or other surface. By reference to Figs. 1 and 2 it will be noticed that the condenser lens C and the source of light D are arranged within the slide carrier F in such a manner that the slides G move successively into the field of the projecting apparatus, that is, between the condenser lens C and the objective B. The slide carrier F is rotated intermittently at the option of the operator in charge so as to permit of displaying the subject matter of the slide G, in active position at the time, any desired length of time, and for this purpose the following arrangement is made: The slide carrier F is provided with a hub $F^2$ mounted to rotate loosely on a shaft H attached to the door or cover $A^3$ on one side of the casing A′, and on the said hub $F^2$ is secured a gear wheel I (see Figs. 2 and 4) in mesh with a gear wheel I′ secured on a transversely-extending shaft $I^2$ journaled in suitable bearings arranged on a bracket $A^4$ attached to or forming part of the door $A^3$. On the shaft $I^2$ is secured a toothed wheel J engaged by an escapement lever J' fulcrumed at J² on the bracket A⁴. The escapement lever J' is provided with an arm J³ extending between two pins K' held on an armature lever K fulcrumed loosely on the shaft I². The armature lever K is adapted to be swung downward by the action of a pair of electro-magnets L when the latter are energized, and a spring K² connected with the free end of the armature lever K serves to swing the armature lever K upward whenever the electro-magnets L are deënergized. The electro-magnets L are in an electric circuit L' provided with a battery or other source of electrical energy L² and with a switch L³ under the control of an operator at any desired distant point. When the switch L³ is closed the electro-magnets L are energized to swing the lever K downward, and when the switch is opened the electro-magnets L are deënergized to allow the spring K² to swing the armature lever K upward. On the armature lever K is fulcrumed a pawl K³ adapted to engage the teeth of the wheel J, and the said pawl K³ is pressed on by a spring K⁴ attached to the lever K to hold the pawl in engagement with the wheel J. Now when the armature lever K is swung downward the pawl K³ glides over the teeth of the wheel J and at the same time the armature lever K actuates the escapement lever J' by the pin K' so as to release the wheel J, and when the lever K swings upward the pawl K³ turns the wheel J until the escapement lever J' again locks the wheel J against further rotation. It will be noticed that when the wheel J is rotated in the direction of the arrow a' then a rotary motion is given by the gear wheels I and I' to the slide carrier F so that the next following slide G is moved into the field of the projecting apparatus. It is understood that the switch L³ is opened and closed as often as is necessary for turning the slide carrier F sufficiently far to move the next following slide G, or any other slide, into the field of the projecting apparatus.

Each of the slides G is provided with a legend G' or with a picture, or with any other desirable subject matter to be projected (see Figs. 3 and 6), and the slide is also provided with a segmental time dial G² having a graduation indicating hours and minuates so that this dial is projected with the subject matter G' onto the distant surface. In conjunction with the time dial G² operate sets of hour hands N and minute hands N' driven by a clockwork N² mounted within the casing A'. The hands of each set of hands N and N' are spaced equal distances apart, and the hands are so arranged that only one set at a time operates in conjunction with the time dial G² (see Fig. 3) to indicate the time of the day or night. It will be noticed by reference to Figs. 1 and 3 that the set of hands N and N' in active position at the time project into the field of the projecting apparatus and register with the time dial G² so that the said hands with the time dial are projected on a distant surface to indicate the time of day or night. It is understood that when one of the hour hands N leaves the end of the dial G² then the next following hour hand moves into display position. In a like manner each minute hand N', after leaving the end of the time dial G, is succeeded by the next minute hand N' so that the correct time is displayed on the distant surface.

From the foregoing it will be seen that when the automatic annunciator is in use, the operator in charge can periodically manipulate the switch L³ so as to cause the slide carrier F to rotate for moving another slide into the field of the projecting apparatus. As each of the slides is provided with the segmental time dial and the hour and minute hands are always in active position, it is evident that both the subject matter of the slides as well as the time of the day or night is projected onto the distant surface.

The projecting lens B is movable in the casing A' in the usual manner, and the condenser lens C is mounted on a frame C' provided with a longitudinally-extending rod C² adjustably engaging a bearing C³ attached to the side of the casing A opposite the door A³. A set screw C⁴ serves to fasten the rod C² in place after the desired lens C is adjusted to proper position relative to the slide G in place of the said lens. The source of light D is mounted on a suitable bracket D' likewise attached to the side of the casing A on which the bracket C³ is secured. As shown in the drawings, the source of light is preferably an electric lamp with a suitable reflector D² for reflecting the light to the condenser lens C.

In Fig. 5 is shown a modified form for intermittently rotating the slide carrier F. The gear wheel I on the hub F² of the slide carrier F is in this case in mesh with a gear wheel O forming part of a train of gear wheels O' of a clockwork O² for rotating the slide carrier. On the hub F² is secured an escapement wheel P engaged by an escapement lever P' fulcrumed at P² and having an arm P³ pressed on by a spring P⁴. The arm P³ forms the armature lever for the electro-magnets L so that when the latter are energized a swinging motion is given to the escapement lever P' to release the escapement wheel P to allow the clockwork O² to rotate the slide carrier F, it being understood that on the operator repeatedly opening and closing the switch L³ the escapement lever P' is repeatedly actuated to allow turning of the slide carrier until the next following slide G is in display position. When the switch L³ is in open position, the escapement lever P' locks the escapement wheel P against rotation so that the slide carrier F remains at a standstill for the time being.

Instead of using the sets of hour and minute hands N, N', a single hour hand N³ and a single minute hand N⁴ may be used as indicated in Fig. 9. In this case the hands N³, N⁴ are mounted on separate arbors N⁵, N⁶ carrying arms Q and Q' pressed on by springs Q² and engaging cam levers Q³, Q⁴ mounted to swing on a stud Q⁵. The cam levers Q³, Q⁴ are actuated by cams R and R' driven continuously in the direction of the arrow from a suitable clockwork R². By the arrangement described the hands N³, N⁴ after having moved to the end of the time dial G² are returned to the beginning end of the time dial, that is, the minute hand N⁴ is returned every hour and then moves forward, while the hour hand N³ is returned after a lapse of every twelve hours.

The legend G' on each slide may be permanently produced thereon in any suitable manner, or the legend may be on a separate piece of glass G⁴, as indicated in Fig. 8 to allow of changing the legend whenever it is desired to do so by changing the separate piece of glass G⁴.

In Fig. 10 is illustrated a slide carrier S provided with guideways S' for the reception of the slides G, the latter extending at right angles to the axis of the carrier, each slide being adapted to pass into the field of the projecting apparatus on intermittently rotating the carrier in the manner above described.

Within the casing A' is arranged a shield extending between the peripheral face of the slide carrier F and the timepiece to protect the latter against the heat emanating from the source of light.

It will be noticed that by mounting the slide carrier F on the cover or door A³ of the casing A' it can be readily removed from the casing on removing the cover for introducing the slides or for repairs and without disturbing the time-indicating device.

Having thus described my invention, I claim as new and desire to secure by Letters Patent:

1. In combination, a projecting apparatus, a slide in the field of the projecting apparatus and provided with subject matter and with a segmental time dial, and a timepiece mounted in the said casing and provided on its hour and minute arbors with sets of hour and minute hands, of which one set is in projecting position in the field of the projecting apparatus and the remaining sets together with the timepiece are out of the said field, the hands in each set being spaced equal distances apart.

2. In combination, a projecting apparatus, a revoluble slide carrier mounted in the said projecting apparatus, a series of slides carried by the said slide carrier and adapted to move successively into the field of the projecting apparatus to be projected onto a distant surface, time-indicating means having a segmental time dial and driven hands, of which the time dial forms a part of each of the slides and the hands are mounted in the projecting apparatus independent of the said slide carrier and project into the field of the apparatus, and means for periodically rotating the said slide carrier.

3. In combination, a projecting apparatus, a revoluble slide carrier mounted in the said projecting apparatus, a series of slides carried by the said slide carrier and adapted to move successively into the field of the projecting apparatus to be projected onto a distant surface, each of the slides being provided with a segmental time dial, clock-driven hands mounted in the said projecting apparatus independent of the said slide carrier and extending into the field of the projecting apparatus and registering with the said dial, and means for periodically rotating the said slide carrier.

4. In combination, a projecting apparatus, a revoluble slide carrier mounted in the said projecting apparatus, a series of slides carried by the said slide carrier and adapted to move successively into the field of the projecting apparatus to be projected onto a distant surface, each of the slides being provided with a legend and with a segmental time dial, clock-driven hands mounted in the projecting apparatus independent of the said slide carrier and extending into the field of the projecting apparatus and registering with the said dial, and means for periodically rotating said slide carrier.

5. In combination, a projecting apparatus, a slide provided with a segmental time dial extending into the field of the said apparatus, hour and minute hands mounted in the said apparatus and extending into the field of the apparatus and registering with the said time dial, and clock-driven means for actuating the said hands.

6. In combination, a projecting apparatus, a slide provided with a segmental time dial extending into the field of the said apparatus, hour and minute hands mounted in the said apparatus and extending into the field of the apparatus and registering with the said time dial, the said hour and minute hands being arranged in sets, the hands in each set being spaced equal distances apart, and clock-driven means for actuating the said hands.

7. In an apparatus of the class described, a slide provided with a legend and with a segmental time dial.

8. In an apparatus of the class described, the combination of a slide provided with a segmental time dial, and hour and minute hands adapted to indicate the time on the said dial.

In testimony whereof I have signed my name to this specification in the presence of two subscribing witnesses.

JACOB H. GENTER.

Witnesses:
EDITH I. SMITH,
FLORENCE S. WALLACE.

Copies of this patent may be obtained for five cents each, by addressing the "Commissioner of Patents, Washington, D. C."